(12) United States Patent
Kerr et al.

(10) Patent No.: US 7,934,496 B2
(45) Date of Patent: May 3, 2011

(54) OUTDOOR SOLAR COLLECTOR AND INTEGRATED DISPLAY PANEL

(75) Inventors: Paul Kerr, Niagara Falls (CA); Philip B. Kerr, Ottawa (CA)

(73) Assignee: Paul Kerr, Niagara Falls (CA)

( * ) Notice: Subject to any disclaimer, the term of this patent is extended or adjusted under 35 U.S.C. 154(b) by 826 days.

(21) Appl. No.: 11/986,902

(22) Filed: Nov. 27, 2007

(65) Prior Publication Data

US 2008/0178868 A1 Jul. 31, 2008

(51) Int. Cl.
*D24J 2/20* (2006.01)
(52) U.S. Cl. .......................... 126/651; 126/652
(58) Field of Classification Search ................. 126/651, 126/652, 653, 654; 40/612
See application file for complete search history.

(56) References Cited

U.S. PATENT DOCUMENTS

| | | | | | |
|---|---|---|---|---|---|
| 2,907,318 | A | * | 10/1959 | Awot | 126/658 |
| 5,435,087 | A | * | 7/1995 | Karkar et al. | 40/575 |
| 7,810,491 | B2 | * | 10/2010 | Benvenuti | 126/653 |
| 2009/0194095 | A1 | * | 8/2009 | Fairstein | 126/652 |

\* cited by examiner

*Primary Examiner* — Alfred Basichas
(74) *Attorney, Agent, or Firm* — Frank J. Bonini, Jr.; John F. A. Earley, III; Harding, Earley, Follmer & Frailey, P.C.

(57) ABSTRACT

A solar collector panel which can also be utilized to display information and/or images and/or messages and having an external frame, with a transparent upper panel securely positioned within the frame. A lower panel is positioned within the frame and spaced in relation to the upper panel so as to provide a closed chamber between the upper panel and the lower panel, an upper surface of the lower panel having applied thereon heat conversion means for converting solar radiation to heat energy, the heat conversion means providing thereon information, an image or message which is visible above the upper surface of the upper panel. A back panel is positioned within the frame, so as to define a closed volume of air space between the lower panel and the back panel through which air may flow. Intake and exhaust pipes introduce air into the frame, and transfer heated air from the frame.

1 Claim, 2 Drawing Sheets

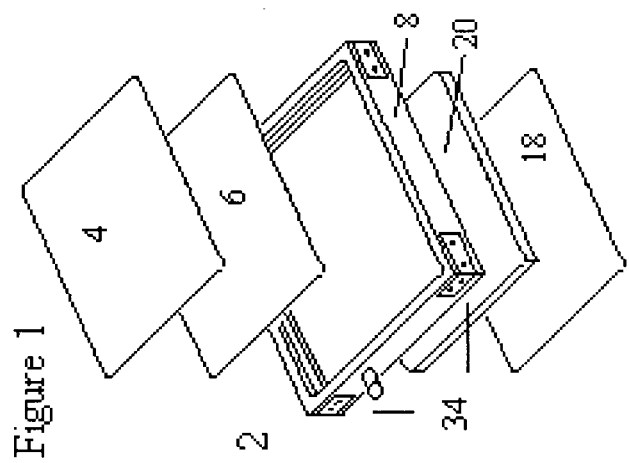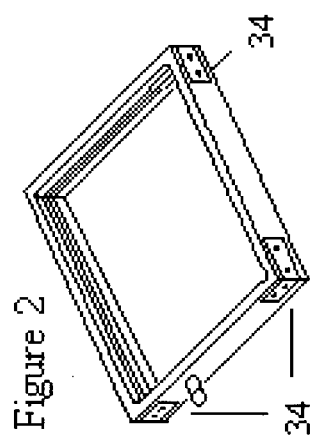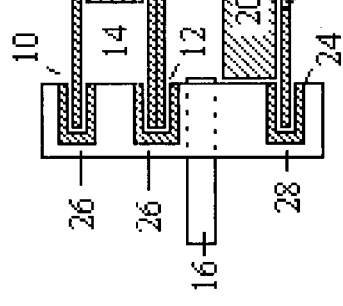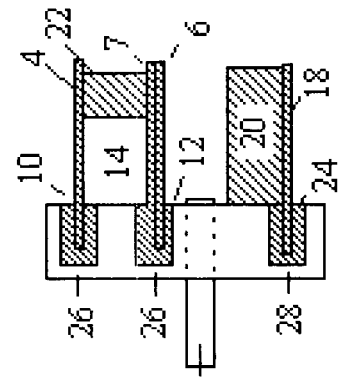

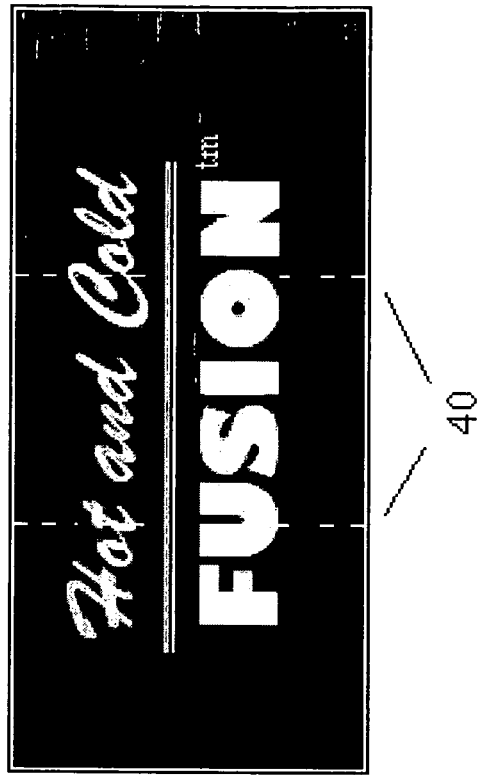
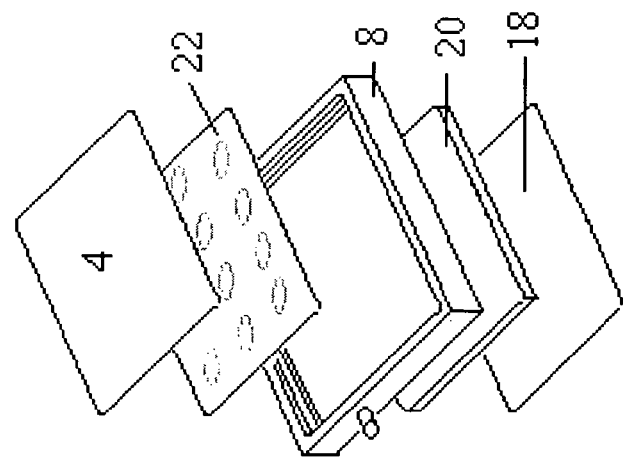
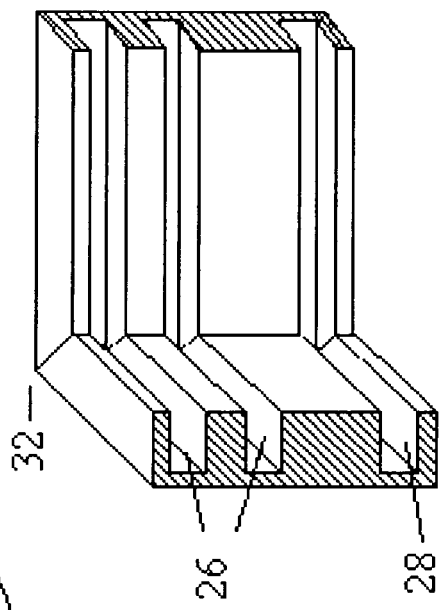
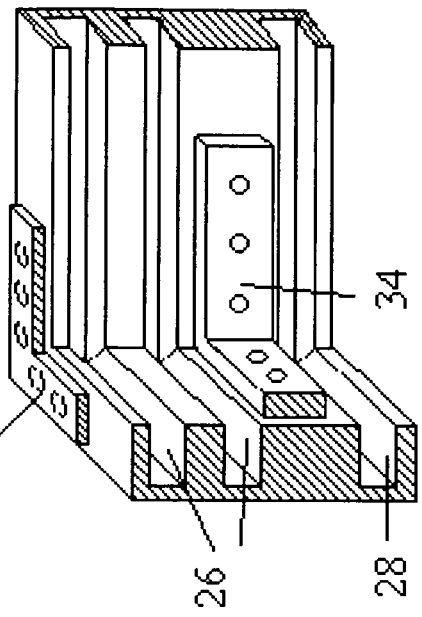

OUTDOOR SOLAR COLLECTOR AND INTEGRATED DISPLAY PANEL

FIELD OF THE INVENTION

The present invention relates to a panel, and particularly relates to a solar collector panel which can also be utilized to display information and/or images.

BACKGROUND OF THE INVENTION

There is an increasing awareness of the need to have access to safe, accessible, inexpensive and reliable forms of energy which do not produce greenhouse gases or toxic or harmful emissions, and which are either renewable, or which are widely available and in a virtually limitless supply. To date, efforts have been made to harness, for example, wind and solar energies, but widespread adoption of these technologies has not been achieved, due in part to the expense of the combination of designing, manufacturing, installing and maintaining these technologies. Consequently, there is a need for a simple, safe, inexpensive and reliable device and method for harvesting the energy which is abundantly available in the form of solar energy.

Additionally, to reduce the costs and risks generally associated with energy distribution, handling and movement, it is desirable to collect energy which is proximate to the location where the energy may be utilized, thereby reducing the costs associated with energy distribution, handling and movement.

Finally, as solar panels may be utilized in places where it may be desirable or beneficial to provide from one or more solar panels, information and/or images, it is beneficial to provide this additional capability.

SUMMARY OF THE INVENTION

The object of the present invention is to provide a solar panel which collects solar light and converts the solar light into heat, which is available for heating homes, buildings, water and other heating and cooling applications, and for conversion into other forms of energy such as electricity.

It is a further object of the present intention to provide a device which collects solar energy and converts the solar light into heat, and also provides a flat surface upon which information and/or images may be presented

BRIEF DESCRIPTION OF THE DRAWINGS

A preferred embodiment of the present intention is described below with reference to the accompanying drawings, in which:

FIG. 1 is an exploded view of an embodiment of the solar panel of the present invention;

FIG. 2 is a view of the frame of an embodiment of the solar panel of the present invention;

FIG. 3 is an exploded cross-sectional view of a portion of one side of the frame, seals, glass plates, insulation and backing plate of one embodiment of the present invention;

FIG. 4 is an assembled cross-sectional view of a portion of one side of the frame, seals, glass plates, insulation and backing plate of one embodiment of the present invention;

FIG. 5 is the front view of one embodiment of the panel with an advertisement thereon;

FIG. 6 is the front view of three panels connected together with a single continuous advertisement thereon;

FIG. 7 is an exploded view of an embodiment of the present invention with ring shaped glass support members placed therein;

FIG. 8 is a cutaway view of a corner of the frame;

FIG. 9 is a cutaway view of a corner view of the frame with attachment brackets attached thereto.

DESCRIPTION OF THE PREFERRED EMBODIMENT

As described herein, in the preferred embodiment, the present invention provides, as shown in the exploded view of FIG. 1, a panel 2 having an upper glass sheet 4 securely positioned within an external frame 8, and a lower glass sheet 6 positioned within the external frame 8 and in spaced relation to the upper glass sheet 4. In the preferred embodiment, the surface of the lower glass sheet 6 is coated with a material 7 shown in FIGS. 3 and 4, which, when contacted by solar light, converts the solar light, or a substantial part thereof, into heat, some of which heat is transferred to the lower glass sheet. In the preferred embodiment, black or dark colored paint is utilized, it being understood that many different materials or coatings are readily available and known to persons skilled in the art, to convert the solar light, or substantial part thereof, into heat and to transfer some of which heat to the lower glass sheet 6.

Referring to FIGS. 3 and 4, in the preferred embodiment, seals 10 and 12 are provided around the entire outer edge of each of the upper glass sheet and lower glass sheet respectively which are adapted to fit securely in grooves 26 on the inside surface of the frame 8 and to provide an airtight seal between the glass sheets and the frame 8 thereby providing an airtight closed volume 14 between the upper glass sheet 4 and the lower glass sheet 8 and enclosed by the frame, the volume 14 between the upper glass sheet 4 and the lower glass sheet 8 subsequently being filled, in a manner known to a person skilled in the art, with argon gas (not shown) to reduce the transfer of heat energy from the surface of the lower glass sheet to the upper glass sheet, and to reduce the overall heat loss through the upper glass sheet.

In an alternative embodiment, glass support members 22 are positioned between the upper glass sheet 4 and the lower glass sheet 8, and a partial vacuum is provided in volume 14 (the air being partially exhausted in a manner known to a person skilled in the art, by way of, for example, a sealable passageway (not shown) between volume 14 and the atmosphere, through which sealable passageway air may be partially exhausted from the volume 14, which passageway is thereafter sealed to prevent air from thereafter traveling into the volume 14 from the atmosphere), thereby reducing the transfer of heat from the lower glass sheet to the upper glass sheet. The glass support members 22 maintain a spaced relationship between the upper glass sheet 4 and the lower glass sheet 8, and reduce the flexing of the glass sheets (and therefore reduce the likelihood of the breakage of the glass sheets when volume 14 is subject to partial or substantial vacuum). The glass support members 22 in the preferred embodiment are made of a relatively low-heat transfer, high melting point material such as thick glass fiber matting or asbestos fiber matting, or high heat synthetic foam rubber, and by way of example, can take the form of small discs or rings 22 such as shown in FIG. 7, or other shapes, which will support the glass sheets, minimize or reduce the flexing of the glass sheets and maintain a spaced relationship between the glass sheets. In one embodiment, tempered glass or glass of increased thickness and strength may be utilized to reduce the risk of breakage of the glass when volume 14 is placed under partial or substantial vacuum.

In one embodiment, during assembly, the glass support members 22 may, for example, be individually positioned and securely affixed to the lower surface of the upper glass sheet 4, so that when the upper glass sheet is positioned within the external frame 8, the glass support members 22 are in contact with or proximate to the upper surface of the lower glass sheet 8.

In the preferred embodiment, a chamber 40 is provided between a backing plate 18 (which backing plate has a seal 24 around the entire outer edge thereof which is adapted to fit securely in a groove 28 on the inside surface of the frame 8 and to provide an airtight seal between the backing plate and the frame 8, the backing plate having insulation 20 positioned thereon to reduce the heat loss through the backing plate) and the lower glass sheet 6 into which chamber 40 air is blown through one or more air intake pipes 16, which air will come into contact with the heated lower glass sheet 6, transferring heat from the lower glass sheet 6 to the air, which heated air is thereafter exhausted from the chamber 40 through one or more exhaust pipes (not shown, but in the preferred embodiment, of a generally similar design to the air intake pipes and of a size sufficient to easily exhaust air from the panel as required or desired).

The heated air exhausted from the chamber 40 may thereafter be used to heat a room, building or other space, water or another liquid, or in a heat engine or Stirling cycle engine (either of which may be used to drive, for example, a generator for electricity or a compressor), or to create refrigerated air (by way of, for example, an ammonia gas based refrigeration system modified to use the heat from the exhaust pipe of the panel of the present invention rather than from the burning of propane gas or other fuel).

In the preferred embodiment, the frame 8 is made of extruded aluminum, it being understood that a worker skilled in the art may choose alternative available materials and cross-sections for the frame. The frame may be manufactured from, for example, four lengths of extruded aluminum having a cross-section substantially as shown in FIG. 8, preferably the ends of each of the lengths being cut at a 45 degree angle 32, the pieces being connectable, for example, by removable brackets 34 shown in FIGS. 1, 2 and 9 which may be screwed to, or otherwise securely fastened to the frame, it being understood that a worker skilled in the art may choose alternative techniques for securely connecting the lengths of extruded aluminum together to create the frame 8.

The frame, and the panel may be mounted outdoors to the ground, or to a building, or to a structure, and may in one embodiment be either permanently positioned (in the northern hemisphere, preferably pointed in a generally southerly direction or in a direction that has access to direct sunlight for at least a portion of the day, and in the southern hemisphere, preferably pointed in a generally northerly direction or in a direction that has access to direct sunlight for at least a portion of the day), or may be mounted on a support (not shown) which allows the frame and panel to pivot about a substantially horizontal axis, or substantially vertical axis, or both, to modify the panel's angle relative to the sun and to thereby increase, or decrease the panels' ability to capture and convert solar light into usable heat.

In the preferred embodiment, the upper glass sheet is made of flat glass of thickness between 5 mm and 10 mm it being understood that a wide range of glass sizes may be utilized and where required for additional strength, tempered glass may by utilized. It is understood that a clear plastic, plexiglass, rigid transparent film or other membrane could be substituted for the upper glass sheet. Similarly, in the preferred embodiment, the lower glass sheet is made of flat glass of thickness between 5 mm and 10 mm it being understood that a wide range of glass sizes may be utilized and where required for additional strength, tempered glass may by utilized. It is understood that a sheet of metal such as steel or aluminum or other strong material having high heat transfer properties could be substituted for the lower glass sheet.

As illustrated in FIG. 5, in one embodiment, the image/information 36 "Your Name Here" may be painted onto or affixed to the top surface of the lower glass sheet. In this embodiment, a dark, preferably black, near black or dark blue background color is painted onto or affixed to a significant background portion of the top surface of the lower glass sheet, the other portion of the top surface of the lower glass sheet being painted or otherwise affixed with the image/information to be displayed (in FIG. 5, "Your Name Here"). In this embodiment, where appropriate, any glass support members are appropriately colored to correspond with that of the image/information being displayed, that is, the glass support members being of the background color unless they are positioned in a place where image/information would otherwise be presented, in which case they are colored appropriately. It is understood that in place of the image/information "Your Name Here", any other information or image may be substituted therefor.

It is understood that rather than painting or otherwise affixing the image/information on the top surface of the bottom glass sheet, this image/information may be painted or otherwise affixed to the bottom side of the upper glass sheet, or to the top side of the upper glass sheet, in which latter case, attention must be given to the exposure of the paint or other material to the rain, snow, hail and to the elements generally. In another embodiment, a thin transparent or near-transparent film or mesh upon which the image/information is painted or affixed, may be placed above the black or darkly painted surface of the lower glass sheet or upon or above the upper surface of the upper glass sheet, or may be placed upon or below the lower surface of the upper glass sheet. In this manner, the image/information is viewable against the black or other dark background color of the panel.

It is understood that to the extent that the image/information to be displayed from the panel may utilize colors which reflect, block, filter, partially filter or which are generally less than optimal for the collecting of solar light and converting same into heat, it is desirable when choosing how to display an image/information, where possible and appropriate, to choose color schemes and image display techniques which to the extent possible, maintain significant overall performance of the panel. For example, it is understood that where possible, a relatively dense white (or other colored) dot (or other shaped element) pattern, with spaces between the dots, may be utilized to display the image/information which image/information would appear solid at a typical viewing distance from the panel while at the same time permitting significant exposure of sunlight onto the black or darkened surface of the lower glass sheet. It is understood that a person skilled in the art of graphic design will select an appropriate size, shape and density of the white (or other colored) dots (or other shaped elements) so that the image/information is clear and readily viewable and attractive against the background color of the panel while at the same time maximizing the amount of light which may come into contact with the black or darkened lower glass sheet surface.

In the preferred embodiment, advertisements, logos or other image/information may be painted or otherwise affixed to the top surface of the lower glass sheet (or upon the black or dark colored paint which has been painted thereon), or on to the lower or upper surface on the upper glass sheet. In an alternative embodiment, a transparent film, for example, made of clear plastic, upon which an advertisement, logo or other image/information materials is provided. The advertisement, logo or other image/information may be painted or otherwise affixed to the transparent film. The transparent film may be affixed to the top surface of the lower glass sheet (or the black or dark colored paint which has been painted thereon), or on to the lower or upper surface on the upper glass sheet in manners known to persons skilled in the art, including, for example, by means of a semi-sticky adhesive which permits the transparent film to be securely affixed to the panel, while readily permitting the film to be removed from the panel when desired. In the embodiments where the film is affixed to the top surface of the lower glass (or upon the black or dark colored paint which has been painted thereon), or on to the lower surface of the upper glass sheet, where glass support members are utilized, these members are adapted to support and separate the glass plates and the film affixed thereto.

The panel may display, for example, governmental, public service, corporate, business or other advertising or information. Alternatively, where desired, the panel may display an attractive image. For example, a panel which may be installed next to a public swimming pool may display an attractive stylized wave pattern against a dark blue background, or a panel which is installed on an exterior house wall may display a pleasant stylized image of distant stars against a black background.

The panel may be mounted, for example at an outdoor stadium, on the top of, or on the external wall of, or adjacent to a commercial or retail building where the benefits of both the advertisements displayed from the panel and the heated air from the panel may be utilized (it being understood that the heated air may be ducted into the HVAC system of the building to supplement the heating requirements of the building, or the heated air may be utilized to create refrigerated air (by way of, for example, an ammonia gas based refrigeration system modified to use the heat from the exhaust pipe of the panel of the present invention rather than from the burning of propane gas or other fuel) or electricity (by way of a generator coupled to a Stirling engine or other heat engine) to the building or for external use. The revenue derived from the advertising and/or display of information from the panel may offset some of the costs of the acquisition, installation and maintenance of the panel.

As illustrated in FIG. 6, multiple panels 2 may be arranged to provide an array of panels 38 in close proximity to or abutting one another, the frame member being colored appropriately to provide a clear, unobstructed, uncluttered and attractive view of the image/information being displayed from the combined panel array (the broken white lines 40 appears in FIG. 6 solely to represent the location where panels abut one another, the broken white lines not appearing in the device when being utilized).

In one embodiment of the present invention, a method of conducting business is established, in which one manufactures panels of the type described herein which are available for sale, lease or otherwise the subject of a commercial transaction with a customer. In another embodiment, the business provides customers with temporary or permanent advertising or information display space on a panel of the type described herein, and in the case of the provision of temporary advertising or information display space, the space on the panel is made available for a period of time, which when elapsed, is available for other customers to be utilized in the same manner. In another embodiment, the business methodology provides making advertising or information space available to third parties, and installing advertising, logos or other image/information materials on the panel, on either a temporary or permanent basis.

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A solar collector panel for heating a space external to the panel, the panel comprising:
    an external frame;
    a transparent upper panel securely positioned within the external frame;
    a lower panel securely positioned within the external frame and spaced in relation to the upper panel so as to provide a closed chamber between the upper panel and the lower panel, an upper surface of the lower panel having applied thereon heat conversion means for converting solar radiation to heat energy, the heat conversion means providing thereon an image which is visible above the upper surface of the upper panel;
    a back panel, the back panel being positioned within the external frame, the panel being spaced in relation to the lower panel so as to define a closed volume of air space between the lower panel and the back panel through which air may flow;
    at least one intake pipe for introducing the air into the closed volume of air space between the lower panel and the back panel, the air being heated by contact with the lower panel which lower panel has been heated by solar radiation passing through the upper panel and the lower panel; and
    at least one exhaust pipe for transferring the heated air to the space external to the panel, the at least one exhaust pipe extending from the closed volume of air space between the lower glass panel and the back panel to the exterior of the solar collector panel.

* * * * *